United States Patent [19]

Miner

[11] 4,244,469

[45] Jan. 13, 1981

[54] PROTECTIVE CARRYING CASE FOR DRILL BITS

[76] Inventor: Robert M. Miner, P.O. Box 373, Casper, Wyo. 82602

[21] Appl. No.: 82,488

[22] Filed: Oct. 9, 1979

[51] Int. Cl.³ .......................... B65D 8/08; B65D 85/00
[52] U.S. Cl. .................................. 206/349; 206/819; 220/83; 220/94 R
[58] Field of Search ............... 206/349, 338, 819, 525, 206/527; 150/50, 48; 220/83, 94 R, 95; 217/122

[56] References Cited

U.S. PATENT DOCUMENTS

| | | | |
|---|---|---|---|
| 2,185,093 | 12/1939 | Reynolds et al. | 150/48 |
| 2,918,165 | 12/1959 | Paulick, Jr. | 206/349 |
| 3,001,900 | 9/1961 | Frieder et al. | 220/83 |
| 3,485,354 | 12/1969 | Bader | 206/338 |
| 3,964,605 | 6/1976 | Vezirian | 206/349 |
| 4,046,279 | 9/1977 | Rosler | 206/349 |

Primary Examiner—William T. Dixson, Jr.
Attorney, Agent, or Firm—Laurence R. Brown

[57] ABSTRACT

A well drilling bit or equivalent tool is provided with a protective carrying case in the form of an open bottom conically shaped plastic hollow bucket with embedded flexible cords or cables extending out of the upper wide mouth to receive plastic sleeve handles for manually carrying the awkward weight of the drilling bit in a protective case thereby preventing damage to the tool. The drill bit is held in place by two opposed endless flexible cord or cable arrays which are fastened together over the drill bit to hold it in mating registration with cutting edges against the conical interior plastic surface of the carrying case. The bit edges thus engage the soft plastic walls for a protective fit, and the awkward weight of the drill bit can be easily manually carried without fear of damage by dropping. Also the plastic protective cover shields the drill bit from damage from any object striking the bit.

8 Claims, 3 Drawing Figures

PROTECTIVE CARRYING CASE FOR DRILL BITS

TECHNICAL FIELD

This invention relates to protective and transparent cases and more particularly it relates to protective carrying cases for well drilling bits.

BACKGROUND ART

A well drilling bit is a costly tool and need be carefully handled in storage or transportation. In particular during rigging and de-rigging of well drilling equipment the drill bit may need be separated and manually carried or stored near the drilling site until ready for use. If dropped or hit with other rigging members the costly drill bit is easily damaged.

The manual handling of drill bits is awkward because of the weight distribution and the difficulty in grasping them. Thus, they are easily dropped and damaged during manual transport.

There has in the prior art been no satisfactory means for protecting, carrying and storing these drill bits and similar heavy cutting tools.

Prior art carriers, boxes and protective devices for heavy tools are generally awkward, hard to assemble and are neither easily handled nor easily transported manually. Representative of the prior art are the following U.S. patents:

Vezirian U.S. Pat. No. 3,964,605—June 22, 1976 has a two piece capsulation for rock drill bit assemblies of soft plastic reinforced with steel straps;

Paulick U.S. Pat. No. 2,918,165—Dec. 22, 1959 provides plastic caps for cutter teeth held on with spring steel clips so that the tool may be temporarily transported or stored without damage; and Lacher U.S. Pat. No. 2,613,847—Oct. 14, 1952 shows a conventional luggage container with flexible rope handles for ease in lifting and carrying.

It is an objective of this invention to provide an improved protective manual transport case for handling heavy and awkward cutting tools such as well drilling bits, which is inexpensive and easy to use and can permit temporary storage and manual transport of the tools without danger of damage.

BRIEF DISCLOSURE OF THE INVENTION

In order to package, protect and store well drill bits, a bottomless bucket-like protective case of conical shape closely fitting the drill bit shape is made of reinforced plastic with an internally disposed reinforcement screen of metal or fibre having urethane molded about it to form the wall of the case body.

Handles of plastic tubing or the like are threaded onto opposed flexible cord cable loops extending from the uppermost larger mouth with the cord ends secured by molding within the plastic walls.

The drill bit is secured in the protective transport case by means of two endless flexible cords or cables threaded through spaced holes on opposite sides of the conical wall and fastened together inside the conical container case with a clasp or the like to hold the cables tautly over the drill bit so that the cutting edges are held in protective engagement with the plastic bucket conical interior surface.

The plastic is light and inexpensive, yet it protects the expensive drill bit from damage in handling and permits ready manual transport of its awkward weight. The open bottom permits drainage and avoids any accumulation of residue.

BRIEF DESCRIPTION OF THE DRAWINGS

Further features, objects and advantages of the invention will be made evident from the following more detailed description made with reference to the accompanying drawings, wherein.

DETAILED DESCRIPTION OF A PREFERRED EMBODIMENT

Figure 1:
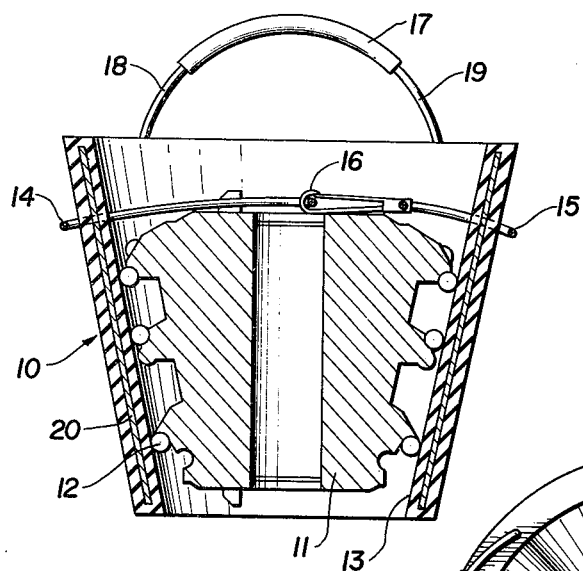
FIG. 1 is an elevation section view of a transport case encompassing a well drill bit as provided by this invention.
Figure 2:
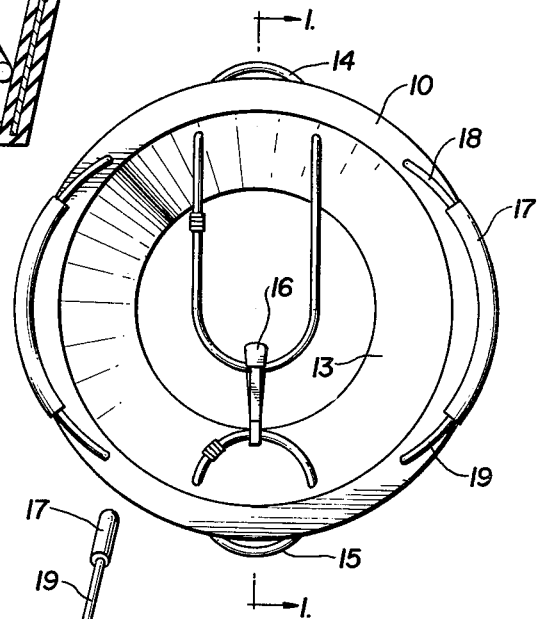
FIG. 2 is a plan view of the transport case afforded by this invention.
Figure 3:
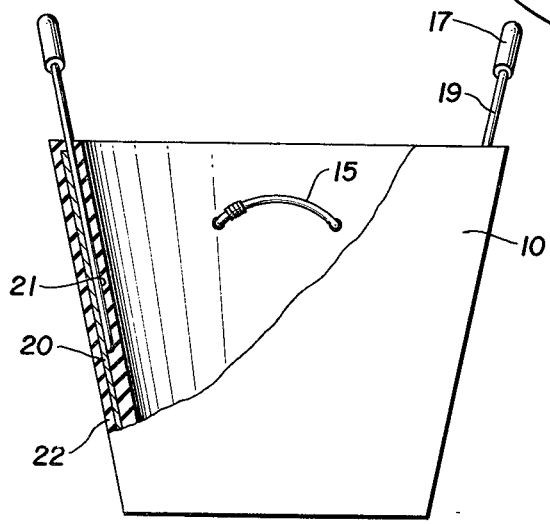
FIG. 3 is an elevation view, partly broken away in section, of the transport case as shown in FIG. 2.

As may be seen from the various views of FIGS. 1 to 3, the conically shaped plastic bucket-like protective carrying case 10, which is topless and bottomless, mates with the drilling bit 11 of generally conical shape, thereby to engage the cutting teeth 12 with the plastic interior surface 13 of the case 10.

The bit 11 is held in mating registration by the two endless flexible cords or cables 14, 15 extending inwardly through the wall of case 10 from opposite sides and connected by the clasp 16 or equivalent fastener to tautly engage the drill bit 11.

A manual carrying handle comprises the plastic handle sleeve 17 about the flexible cord loop 18, 19 whose ends are embedded inside the plastic wall of the case 10.

The plastic case 10 is formed about an internal metallic or fabric screen 20 for stengthening reinforcement to prevent the heavy drill bit 11 from bursting the walls and preventing teeth 12 from cutting through, particularly with repeated usage.

The plastic material 22 of the case walls is preferably reinforced urethane, having the screen 20 as a reinforcing medium. The handle cords or cables 21 are embedded within the plastic and preferably have roughened surfaces which gives an intimate and strong bond with the plastic to easily support the necessary tool weight when the case is carried by handles 17.

Having therefore described the preferred embodiment of the invention those novel features believed descriptive of the nature and spirit of the invention are defined with particularity in the appended claims.

INDUSTRIAL APPLICATION

Drill bits for oil wells and like heavy tools are protected in and manually transported by a reinforced urethane open bottomed conical bucket-like protective carrying case having flexible cord retainer cables retaining the tool in mating registration with cutting teeth engaging the plastic bucket wall. A carrying handle assembly extends from the top of the bucket with plastic sleeves over a pair of flexible cord loops with ends embedded in the plastic. This case easily stores drill bits at the well site to protect against damage from striking objects and permits ready manual transport of the awkward tool weight without danger of dropping to damage the tool.

I claim:

1. A cutting tool protective and carrying case, comprising in combination, a bottomless generally conically shaped body member with walls of a plastic material with a handle array comprising a pair of opposed handles extending from the larger open mouth end of said conically shaped body member with flexible cords extending from opposite sides of the handles into the plastic material of said body member and secured within the plastic material of the body member.

2. A case as defined in claim 1 wherein the body member comprises reinforced urethane.

3. A case as defined in claim 2 including a reinforced plastic body comprising a screen member embedded within said plastic body member.

4. A case as defined in claim 1 having a pair of endless flexible cords extending through the wall of said body member on opposed sides and meeting within the interior of said body member at a fastener thereby serving as a retainer holding a tool in place within said body member during transport.

5. The combination of a conically shaped well drill bit having cutting members disposed on the outside contour of a conical surface and a conically shaped bucket-like plastic protective cover and carrying case in contact with the cutting members.

6. The combination defined in claim 5 wherein the plastic case comprises a strengther screen member embedded in the plastic of said conically shaped case.

7. The combination defined in claim 5 wherein the plastic case is bottomless and topless and has carrying means comprising flexible cords embodied in the plastic of said case and extending from the larger mouth opening of the conically shaped case for manual access.

8. The combination defined in claim 5 including a retaining member of a plurality of flexible cords extending internally into the case and fastened together inside the conically shaped case to engage the drill bit and hold it in place during storage and transport.

* * * * *